United States Patent [19]

Fiorentini

[11] 4,155,508

[45] May 22, 1979

[54] APPARATUS FOR MIXING AND EJECTING FOAMING MATERIALS

[75] Inventor: Carlo Fiorentini, Saronno, Italy

[73] Assignee: Afros S.R.L., Saronno, Italy

[21] Appl. No.: 815,308

[22] Filed: Jul. 13, 1977

[30] Foreign Application Priority Data

Apr. 7, 1977 [IT] Italy .................. 22215 A/77

[51] Int. Cl.² ........................... B05B 15/02
[52] U.S. Cl. ..................... 239/118; 60/560; 60/563; 239/124; 239/414
[58] Field of Search ............. 239/117, 118, 124, 414, 239/416.2; 60/560, 563

[56] References Cited

U.S. PATENT DOCUMENTS

| | | | |
|---|---|---|---|
| 1,888,990 | 11/1932 | Kurath | 60/563 |
| 2,481,991 | 9/1949 | Ernst | 60/560 X |
| 2,634,468 | 4/1953 | Holder | 60/563 X |
| 3,606,168 | 9/1971 | Seaman, Jr. | 239/124 X |
| 3,687,370 | 8/1972 | Sperry | 239/117 X |

Primary Examiner—Johnny D. Cherry
Assistant Examiner—Andres Kashnikow
Attorney, Agent, or Firm—Fleit & Jacobson

[57] ABSTRACT

An apparatus for mixing and ejecting at least two interacting components to provide a foaming material. The apparatus comprises an injection head connected to supply circuits of the individual components, which head includes a mixing and ejecting chamber; the chamber has a cleaning plunger axially reciprocable therein and operated by a double acting cylinder connectable through a first sliding valve to a first pressure fluid supply conduit comprising a one-way valve, and respectively to a branched-off conduit connected to a pressure multiplier cylinder. The control side of multiplier cylinder is in turn connected to the pressure fluid supply through a second sliding valve operatively connected to the first sliding valve.

6 Claims, 4 Drawing Figures

APPARATUS FOR MIXING AND EJECTING FOAMING MATERIALS

This invention relates to an apparatus for mixing and ejecting materials interacting to form foaming material injectable or pourable into a mold or containers for packing; particularly, the invention is directed to an embodiment for an injection head enabling a continuous recycle of the components, and a control for the associated self-cleaning device in the mixing and ejecting chamber of the foaming materials.

Mixing and ejecting heads for foaming materials are known, in which the various components are individually supplied to a mixing chamber, exiting therefrom in the form of a foam which is injected into a mold.

Generally, a mixing chamber comprises a cylindrical hole, having axially sliding therein a nozzle closing and chamber cleaning plunger driven by a pneumatic cylinder; thus, at the end of each operative cycle, the plunger is forward moved within the mixing chamber for both closing the injection nozzles of the individual components and cleaning the chamber.

However, it is known that in any case residues of foaming material remain within the chamber, which residues upon hardening or solidification would tend to jam the plunger.

Therefore, in conventional heads, particularly portable or small sized heads, the difficulty is encountered in releasing such a plunger, since the compressed air available from the standard supply mains is at insufficient pressure to operate the plunger control cylinder, unless unduly increasing the dimensions of the cylinder, thereby rendering a head heavy and difficult to handle.

Therefore, it is the object of the present invention to provide an apparatus for controlling injection heads of the aforesaid type, such an apparatus using a pressure multiplier cylinder capable of supplying a control pressure for the plunger operating and head cleaning cylinder at a remarkably higher rate, for example four times as much as that of the standard mains pressure.

Additionally, the present invention provides a head for mixing and ejecting foaming materials, as above defined, such a head incorporating rotary valves for controlling the supply of the individual components to the mixing chamber and recycle, respectively, in a separate circuit.

Generally, according to the invention, an apparatus is provided for mixing and ejecting at least two interacting components to supply a foaming material that can be poured or injected into a mold, comprising an injection head connected to the individual component feeding circuits and defining an axially extending chamber for mixing and injecting said mixed components, a cleaning plunger slidingly driven in said chamber by a double acting cylinder, in turn, said cylinder being connectable through a first slide valve to a first pressure fluid supply conduit including a one-way valve, and respectively to a branched-off conduit connected to a pressure multiplier cylinder, the control side of which is connected, in turn, to the pressure fluid source through a second slide valve operatively connected with the former.

Preferably, the two slide valves are controlled by a common electrovalve, so as to control -through said multiplier cylinder- at least the backward movement of the main piston for the cleaning plunger operating cylinder, to a pressure rate higher than said pressure source rate.

Furthermore, according to the invention, a head of the above mentioned type is provided, as comprising for each of the component supply circuits a rotary distributing valve for supplying the component to the mixing chamber and in a recycle circuit, respectively, which valve is operated by a rack fast with the main piston of the cleaning plunger.

These and other features of an apparatus according to the invention will be more particularly illustrated hereinafter with reference to the accompanying drawings, in which.

Figure 1:
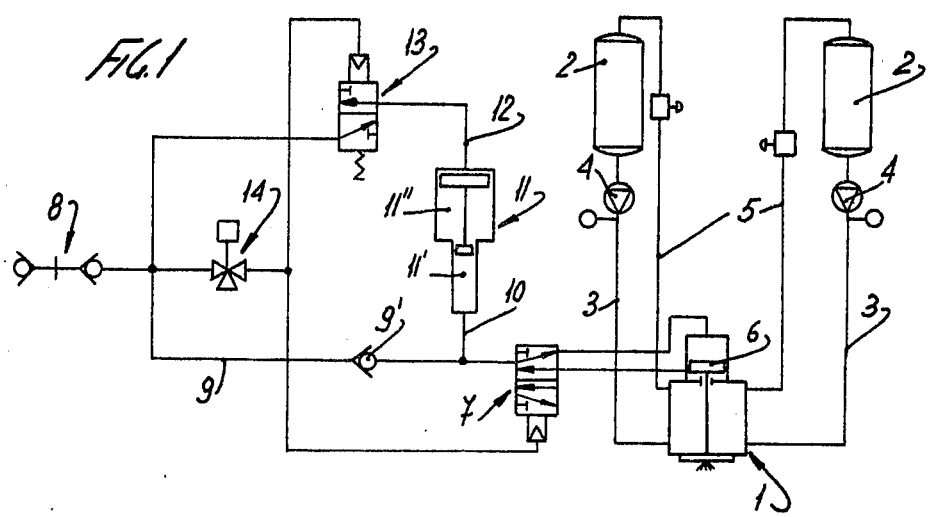
FIG. 1 is a general diagram of the apparatus according to the invention.

FIG. 1 shows the general diagram of the apparatus comprising a mixing and ejecting head 1 for two interacting components to form a foaming material. Each component is placed in a proper reservoir 2 connected to head 1 by a delivery pipe 3 containing a feed pump 4, respectively through a return conduit 5 for component recycling.

As hereinafter set forth with reference to FIGS. 2 through 4, said head 1 comprises an axially extending mixing chamber having a cleaning plunger longitudinally sliding therein, as driven by a double acting cylinder, schematically shown at 6 of FIG. 1.

The two sides of said double acting cylinder 6 are connectable to a pressure fluid supply through a four-way type of sliding valve 7 having a pneumatic control.

Particularly, as shown in the diagram of FIG. 1 the inlet of the sliding valve 7 is connected through a first conduit 9 provided with a one-way valve 9', to a pressure fluid supply 8; this sliding valve 7 is also connected to a branched-off conduit 10 from a pressure multiplier 11 in the form of a double cylinder comprising a pressure multiplying section 11' of a reduced diameter, connected to conduit 10 between said sliding valve 7 and one-way valve 9', and a control section 11'', of a larger diameter than the former, connected through a conduit 12 and a three-way type of sliding valve 13 having a pneumatic control, to said fluid supply 8.

As shown in FIG. 1, both of said sliding valves 7 and 13 are operatively connected or are controlled by a single three-way electrovalve 14 supplied with fluid pressure through fluid supply 8.

Briefly stated, the operation of the apparatus of FIG. 1 is as follows. Starting from the condition shown in FIG. 1, at the beginning of an operative cycle, the cleaning plunger 17 should be moved back into the mixing chamber by controlling the retraction for the piston of control cylinder 6. Therefore, the electrovalve 14 supplying the fluid pressure to the controls of sliding valves 7 and 13, respectively, is operated. Thereby, said sliding valves will change the condition thereof and enable fluid supply both to the control section 11' of pressure multiplying cylinder 11 and to double acting cylinder 6 controlling said head 1. However, due to the provision of check valve 9' in conduit 9, said control cylinder 6 will be supplied with at a high pressure larger than said fluid pressure, due to the fluid exiting from multiplying section 11' of the multiplier cylinder. Thus, cylinder 6 is controlled at a high pressure allowing a secure release of the plunger 17, even if said control cylinder 6 is of reduced size. Upon release of the plunger and completion of the operative cycle, the position of the sliding valves 7 and 13 is reversed by a second control to electrovalve 14. Accordingly, section 11″ of multiplier cylinder 11 is connected to exhaust or vent, while pressure multiplying section 11′ of cylinder 11 and cylinder 6 are simultaneously connected through sliding valve 7 to pressure fluid supply 8. As a result, the pistons of multiplier cylinder 11 are caused to retract, allowing the recharging of high pressure section 11′ and at the same time the piston of cylinder 6 is operated for forward moving the cleaning plunger 17 within the mixing chamber. During forward movement of the cleaning plunger 17 the individual components are switched on a recycle circuit to the associated stocking reservoirs 2, as hereinafter set forth with reference to the remaining figures of the accompanying drawings.

From the foregoing, with reference to FIG. 1, it will be appreciated that an apparatus has been provided for controlling cylinder 6 to a pressure higher than mains pressure by piston retraction, while forward movement is provided by mains pressure. However, also the control of cylinder 6 for forward movement of cleaning plunger could be provided at a higher pressure than mains pressure through said multiplier cylinder 11, if desired. To this end, it would suffice to dimension the stroke of the pistons of said multiplier cylinder so that a sufficient amount of fluid is available for both operations. In such case, it would be obviously required to provide by a suitable throttle on the exhaust side of three-way sliding valve 13 for suitably delaying the exhaust or vent of section 11″ of multiplier cylinder 11 when the plunger forward movement control is given by means of cylinder 6.

Figure 2:
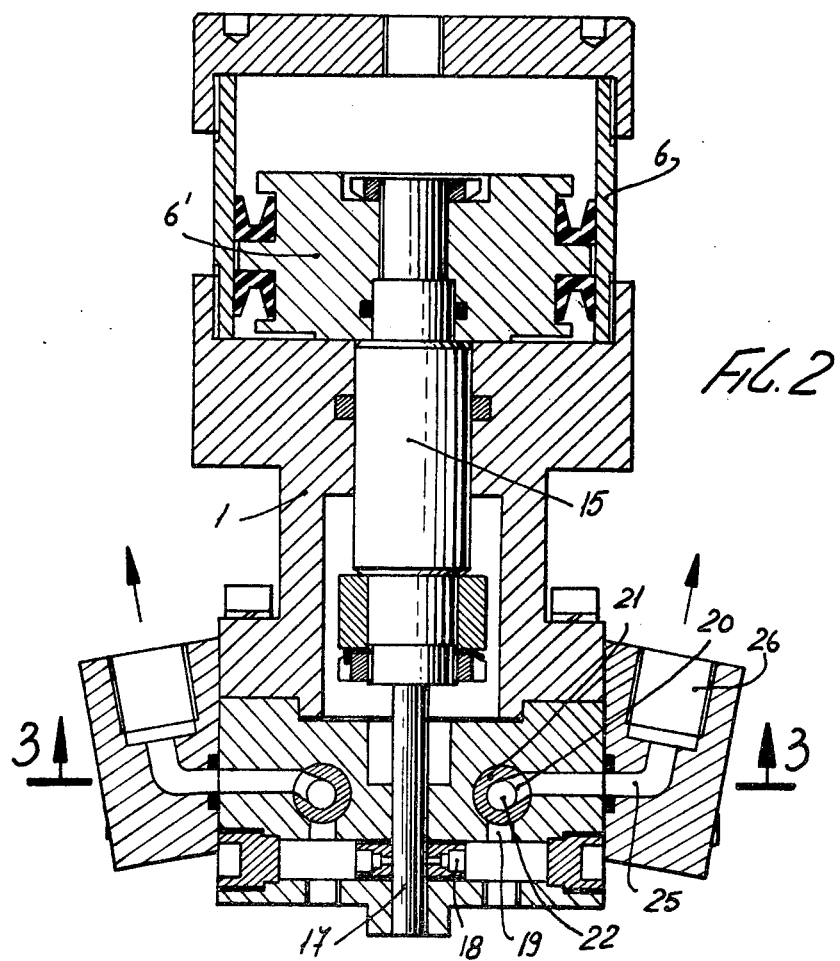
FIG. 2 is a longitudinal sectional view of the injection head.
Figure 4:
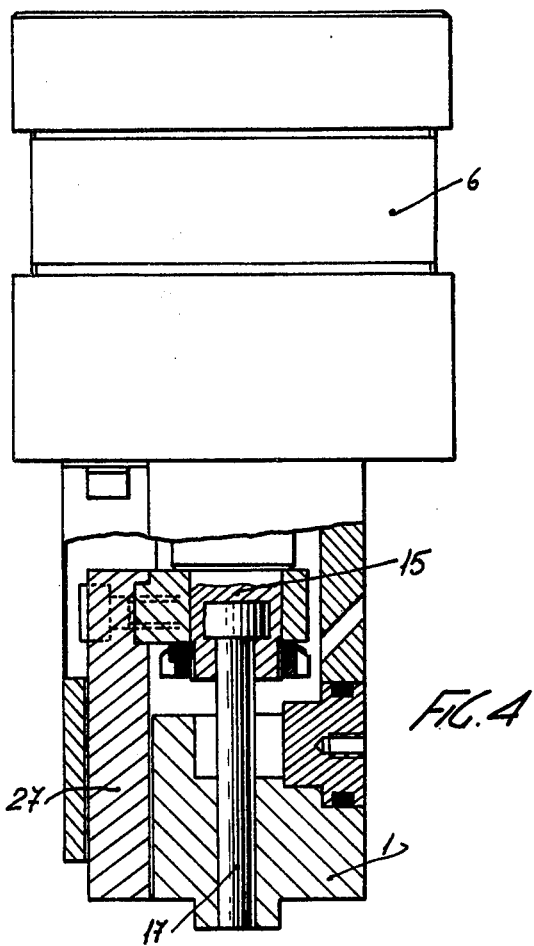
FIG. 4 is a fragmentary longitudinal sectional view taken in a plane at right angles to that of FIG. 2.
Figure 3:
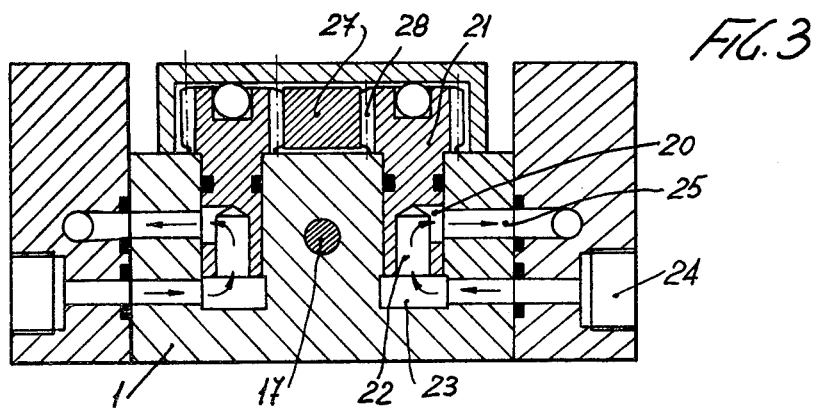
FIG. 3 is a cross-sectional view taken along line 3—3 of FIG. 2.

Referring to FIGS. 2, 3 and 4, an embodiment will now be described of a head 1 incorporating recycle valves for the individual components. Head 1 of FIG. 2 also comprises a double acting cylinder 6, the stem 15 of which is extended with a cleaning plunger 17 for the component mixing chamber. Since the construction of head 1 is symmetrical as to the arrangement of the individual parts, such a head will be described in the following with reference to its right-hand half.

Particularly, for each component there is provided an injection nozzle 18 opening into the mixing chamber, which nozzle is connectable through a branched-off conduit 19 with a radial passage 20 of a rotary valve 21, continuing with an axial passage 22 of the valve, opening into an underlying cavity or recess 23, the latter being always in communication with inlet 24, to which the component delivery conduit 3 is connected.

Radial passage 20 of rotary valve 21 can be also communicated with a recycle channel or duct 25 leading to an outlet 26 connected to the component recycle conduit 5. The component recycle condition is shown in FIGS. 2 and 3, whereby inlet 24 is directly connected with outlet 26 through passages 23, 22, 20 and 25, respectively. Component supply to nozzle 18 is through inlet 24, passage 23, 22, 20 and 19, respectively, after suitably controlling valve 21 to rotate, bringing radial passage 20 to be coincident with the above mentioned branched-off passage 19.

The rotation control for valves 21 can be very simply provided by taking advantage of the same movement of piston 6′ in said cylinder 6 controlling the head cleaning plunger 17.

To this end, a rack 27 is made fast with stem 15 of cylinder 6, this rack being located laterally of and parallel to cleaning plunger 17. A toothing is formed on both sides of the rack and meshes with a corresponding toothing of a pinion 28 formed or made fast with rotary valve 21. Obviously, the size of said pinion shall be proportioned to the rack stroke, so that radial passage 20 of the valve can rotate from the position of FIGS. 2 and 3, which it communicates with recycle channel or duct 25, to a position wherein said passage 20 communicates with branched-off passage 19 of the injection nozzle.

Thus, both said cleaning plunger 17 and all of the shut off valves and recycle valves for the individual components to the associated stocking reservoirs are simultaneously operated by a single control cylinder.

From the foregoing and as shown in the accompanying drawings, it will be appreciated that an apparatus has been provided for mixing and ejecting foaming materials, wherein the mixing and ejecting head incorporates the recycle valves for the individual components, such valves being operated by the same cylinder controlling forward and backward movements of the cleaning plunger for the ejecting chamber, and wherein said cylinder controlling the cleaning plunger can be supplied with a fluid, such as compressed air, having a pressure considerably higher than standard mains pressure, thereby assuring a secure release of said cleaning pin, while the head construction or structure is kept within extremely reduced overall size, and accordingly exhibits an improved handling.

What I claim is:

1. An apparatus for mixing and ejecting at least two interacting components to provide a foaming material, comprising an injection head and means for connecting said injection head to supply circuits of the individual components, said head comprising a chamber for mixing and ejecting said components, the chamber having a cleaning plunger axially reciprocable therein, said plunger interconnected with a piston positioned within a double acting cylinder, said cylinder interconnected through a first sliding valve and a one-way valve to a first pressure fluid supply conduit, a branched-off conduit connected between said one-way valve and first sliding valve, a pressure multiplier cylinder in said branched-off conduit, the control side of which is in turn connected to the pressure fluid supply through a second sliding valve, and control means for controlling said first and second sliding valves.

2. An apparatus according to claim 1, wherein said control means comprises a single electrovalve interconnecting the first and second sliding valves with said pressure fluid supply.

3. An apparatus according to claim 1, wherein for each of the interacting components said head comprises a rotary valve operable to connect a component supply conduit with an injection nozzle in the mixing chamber and respectively with a component recycle conduit to a supply reservoir.

4. An apparatus according to claim 3, wherein said rotary valve includes a radial passage that can alternatively communicate with a recycle duct or channel or a branch conduit for supplying said injection nozzle, wherein said radial passage is in fluid communication with an axial channel in said valve, and means for interconnecting said axial channel with said component supply conduit.

5. An apparatus according to claim 3, wherein said rotary valves are controlled by a common operating device.

6. An apparatus according to claim 5, wherein said common operating device comprises a pinion meshing with a rack laterally of and parallel to the cleaning plunger of the mixing chamber, which rack is interconnected with the said plunger for movement thereby.

* * * * *